US 8,194,992 B2

(12) United States Patent
Marchesotti (10) Patent No.: US 8,194,992 B2
(45) Date of Patent: Jun. 5, 2012

(54) SYSTEM AND METHOD FOR AUTOMATIC ENHANCEMENT OF SEASCAPE IMAGES

(75) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 991 days.

(21) Appl. No.: 12/175,857

(22) Filed: Jul. 18, 2008

(65) Prior Publication Data

US 2010/0014776 A1    Jan. 21, 2010

(51) Int. Cl.
*G06K 9/40* (2006.01)
(52) U.S. Cl. ........ 382/254; 382/162; 382/165; 382/224; 382/260; 358/452; 358/518; 358/537
(58) Field of Classification Search .................. None
See application file for complete search history.

(56) References Cited

U.S. PATENT DOCUMENTS

| | | |
|---|---|---|
| 5,347,374 A | 9/1994 | Fuss et al. |
| 5,357,352 A | 10/1994 | Eschbach |
| 5,363,209 A | 11/1994 | Eschbach et al. |
| 5,371,615 A | 12/1994 | Eschbach |
| 5,414,538 A | 5/1995 | Eschbach |
| 5,450,217 A | 9/1995 | Eschbach et al. |
| 5,450,502 A | 9/1995 | Eschbach et al. |
| 5,802,214 A | 9/1998 | Eschbach et al. |
| 6,009,209 A | 12/1999 | Acker et al. |
| 6,267,051 B1 | 7/2001 | Feldman et al. |
| 6,278,491 B1 | 8/2001 | Wang et al. |
| 6,502,583 B1 | 1/2003 | Utsugi |
| 6,977,679 B2 * | 12/2005 | Tretter et al. ............. 348/231.2 |
| 7,031,534 B2 | 4/2006 | Buckley |
| 7,035,467 B2 | 4/2006 | Nicponski |
| 2002/0172419 A1 | 11/2002 | Lin et al. |
| 2002/0196973 A1 * | 12/2002 | Schroder et al. ............. 382/167 |
| 2003/0223622 A1 * | 12/2003 | Simon et al. ................. 382/118 |
| 2004/0052424 A1 * | 3/2004 | Kokemohr ................... 382/254 |
| 2004/0120572 A1 * | 6/2004 | Luo et al. ..................... 382/159 |
| 2005/0105776 A1 * | 5/2005 | Luo et al. ..................... 382/115 |
| 2006/0280427 A1 * | 12/2006 | Snowdon et al. .............. 386/46 |
| 2007/0005356 A1 | 1/2007 | Perronnin |
| 2007/0009167 A1 | 1/2007 | Dance et al. |
| 2007/0258648 A1 | 11/2007 | Perronnin |

(Continued)

OTHER PUBLICATIONS

Vailaya et al. "Content-Based Hierarchical Classification of Vacation Images", IEEE, pp. 518-523.*

(Continued)

*Primary Examiner* — Sath V Perungavoor
*Assistant Examiner* — Jason Heidemann
(74) *Attorney, Agent, or Firm* — Fay Sharpe LLP (57) ABSTRACT

A content-based image processing system and method are disclosed. The method includes automatically identifying whether an original image is a seascape. For an image which is identified as being a seascape, the method includes automatically assigning an enhancement class for the image, selected from a plurality of enhancement classes, the classes comprising a first enhancement class for sea landscape images and a second enhancement class for portrait images. The image is processed to generate an enhanced image. Where the image is assigned to the first enhancement class, this includes applying a first enhancement chain, which may include applying a polarizing filter. Where the image is assigned to the second enhancement class, the processing includes applying a second enhancement chain, which may include detecting regions corresponding to skin in the image and selectively applying local contrast enhancement to those regions corresponding to skin.

22 Claims, 5 Drawing Sheets

U.S. PATENT DOCUMENTS

2007/0268534 A1  11/2007  Duan et al.
2008/0069456 A1  3/2008  Perronnin

OTHER PUBLICATIONS

U.S. Appl. No. 12/123,586, filed May 20, 2008, Marchesotti.

L.Marchesotti, et al., *Improving Holiday Pictures: Winter and Beach Image Enhancement*, (to appear in) *IS&T/SPIE Intl. Symposium on Electronic Imaging, Image Quality and System Performance*, vol. 27-31, San Jose, CA, Jan. 2008.

S.J.McKenna, et al., *Modeling Facial Colour and Identity with Gaussian Mixtures, Pattern Recognition*, 31, 12, 1883-1892 (1998).

C.Csurka, et al., *Visual Categorization with Bags of Keypoints, ECCV Intl. Workshop on Statistical Learning in Computer Vision*, Prague, 2004.

F.Perronnin, et al., *Adapted Vocabularies for Generic Visual Categorization, In European Conf. on Computer Vision*, 2006.

P.Quelhas, et al., *Modeling Scenes with Local Descriptors and Latent Aspects, In ICCV*, 2005.

P.Carbonetto, et al., *A Statistical Model for General Contextual Object Recognition, In ECCV*, 2004.

A.Bosch, et al., *Scene Classification via pLSA, In ECCV*, 2007.

M. Bressan, et al., *Local Contrast Enhancement, Proceedings of SPIE-IS&T Electronic Imaging—Color Imaging XII: Processing, Hardcopy, and Applications*, 2007.

H.Barrow, et al., *Recovering Intrinsic Scene Characteristics from Images, In Computer Vision Systems*, A.Hanson and E.Riseman, Eds. Academic Press, pp. 3-26, 1978.

G.D.Finlayson, et al., *On the Removal of Shadows From Images, ECCV*, 2002.

S.Battiato, et al., *Automatic Global Image Enhancement by Skin Dependent Exposure Correction, In Proceedings of IEEE-EURASIP Workshop on Nonlinear Signal and Image Processing*, 2003.

M.J.Jones, et al., *Statistical Color Models with Application to Skin Detection, IJCV*, (46), No. 1, pp. 81-96, Jan. 2002.

http://www.photoflexlightingschool.com/.

http://www.www.flickr.com.

http://www/photo.net.

http://photoshoptutorials.ws/photoshop-tutorials/photo-effects/polarizing-filter.html.

T.Arici, et al., *Skin-Aware Local Contrast Enhancement, ICIP, IEEE International Conference on vol. 1*, pp. I-521-I-524, 2007.

R.Eschbach, et al., *Automatic Enhancement of Scanned Photographs, In El Color Imaging: Device Independent Color, Color Hardcopy and Graphic Arts*, 1999.

\* cited by examiner

SYSTEM AND METHOD FOR AUTOMATIC ENHANCEMENT OF SEASCAPE IMAGES

CROSS REFERENCE TO RELATED PATENTS AND APPLICATIONS

The following copending application, the disclosure of which is incorporated herein in its entirety by reference, is mentioned:

U.S. application Ser. No. 12/123,586, filed on May 20, 2008, entitled METHOD FOR AUTOMATIC ENHANCEMENT OF IMAGES CONTAINING SNOW, by Luca Marchesotti.

BACKGROUND

The exemplary embodiment relates to a system and method for automated improvement of digital images. It finds particular application in connection with seascape images and will be described with particular reference thereto. However, it is to be appreciated that it may find more general application in image classification, image content analysis, and so forth.

Widespread availability of devices capable of acquiring digital images, such as digital cameras, cell phones, and other direct-digital imagers, and of optical scanners that convert film images, paper-printed images, and the like into digital format, has led to generation of large numbers of digital images. Regardless of the final medium in which the images will be managed, shared and visualized, the quality expectations of users are growing.

Beach locations are popular among both experienced photographers and novices for shooting images. The combination of water, sky, vegetation and sand, combined with illumination and meteorological conditions, can provide good aesthetic value. However, the results obtained do not always meet the photographer's expectations. There is often too much or too little light for the camera to deal with. Additionally, directional sunlight combined with reflective elements like sand or water can "burn" the photo or cause harsh shadows.

When human subjects are present in the picture, the shadows on the skin are typically not desired. Professional photographers often use reflective panels and wide lights to eliminate these shadows when they shoot on a beach. Experienced photographers lacking such tools may try using a flash and generally avoid shooting into the sun. Even when such techniques are used, however, there is difficulty in achieving images in which the sea and sky are blue, excessive shadows in faces are avoided, and there is sufficient contrast in the sea to appreciate its texture.

The exemplary embodiment overcomes these problems by providing automated techniques for improving the visual appearance of seascape images.

INCORPORATION BY REFERENCE

The following references, the disclosures of which are incorporated herein in their entireties by reference, are mentioned:

Luca Marchesotti and Marco Bressan, "Improving Holiday Pictures: winter and beach image enhancement," IS&T/SPIE's International Symposium on Electronic Imaging, Image Quality and System Performance V, 27-31 Jan. 2008, San Jose, Calif., USA, disclose linking assessments of perceptual quality to enhancement algorithms.

U.S. Pat. No. 6,267,051, entitled METHOD AND SYSTEM OF IMPLEMENTING CORRECTIONS IN UNDERWATER IMAGES, by Feldman, et al., discloses determining the existence of an image captured underwater by analyzing the image record or obtained by reading information received from the customer image order and determining a level of correction for the image.

U.S. Pat. No. 7,035,467, entitled METHOD AND SYSTEM FOR PROCESSING IMAGES FOR THEMED IMAGING SERVICES, by Nicponski, discloses determining the general semantic theme of a group of images. A plurality of semantic theme processors, one for each semantic classification, is provided to produce enhanced value imaging services and products for image groups that fall into an appropriate semantic theme.

U.S. Pub. No. 2007/0005356, published Jan. 4, 2007, entitled GENERIC VISUAL CATEGORIZATION METHOD AND SYSTEM, by Florent Perronnin, discloses techniques for classifying images based on class visual vocabularies constructed by merging a general visual vocabulary with class-specific visual vocabularies.

U.S. Pub. No. 2007/0258648, published Nov. 8, 2007, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. An image classifier classifies the image respective to the plurality of image classes based on the gradient-based vector representations of class similarity.

U.S. Pub. No. 2008/0069456, published Mar. 20, 2008, entitled BAGS OF VISUAL CONTEXT-DEPENDENT WORDS FOR GENERIC VISUAL CATEGORIZATION, by Florent Perronnin, discloses an image classification method which includes generating category context models for image categories which include sums of soft co-occurrences of pairs of visual words in geometric proximity to each other in training images assigned to the category. An image category can be assigned to a new image to be classified based on closeness of context information about the image to the category context models.

U.S. Pat. Nos. 5,357,352, 5,363,209, 5,371,615, 5,414,538, 5,450,217, 5,450,502, and 5,802,214 to Eschbach, et al., U.S. Pat. No. 5,347,374 to Fuss, et al., and U.S. Pat. No. 7,031,534 to Buckley disclose automated image enhancement methods.

Csurka, et al., "Visual Categorization with Bags of Keypoints," ECCV International Workshop on Statistical Learning in Computer Vision, Prague, 2004, discloses a method for generic visual categorization based on vector quantization.

U.S. Pub. No. 2002/0172419, entitled IMAGE ENHANCEMENT USING FACE DETECTION, by Lin, et al., discloses using face detection algorithms for automatically detecting human faces in an image and automatically enhancing an appearance of the image based on the human faces in the image.

U.S. Pub. No. 2007/0268534, entitled HISTOGRAM ADJUSTMENT FOR HIGH DYNAMIC RANGE IMAGE MAPPING, by Duan, et al., discloses a method of automatic mapping of image data which includes representing image data for an image as luminance values, determining a key value as a function of an average luminance value of the image and of minimum and maximum luminance values of the image, generating offset-adjusted luminance values including applying an offset to each of the luminance values, the offset being a function of the determined key value, and computing a tone reproduction curve for at least a region of the image which includes applying a mapping function to the offset-adjusted luminance values.

U.S. Pub. No. 2007/0009167, entitled CONTRAST ENHANCEMENT OF IMAGES, by Dance, et al., discloses a method and system for contrast enhancement of an input image that utilizes luminance values of pixels of the input image to derive transforms.

BRIEF DESCRIPTION

In accordance with one aspect of the exemplary embodiment, a content-based image processing method includes automatically identifying whether an original image is a seascape. For an image which is identified as being a seascape, the method further includes automatically assigning an enhancement class for the image, selected from a plurality of enhancement classes, the classes comprising a first enhancement class for sea landscape images and a second enhancement class for portrait images. The image is processed to generate an enhanced image. Where the image is assigned to the first enhancement class, the processing includes applying a first enhancement chain, and where the image is assigned to the second enhancement class, the processing includes applying a second enhancement chain. The enhanced image is output.

In accordance with another aspect of the exemplary embodiment, a content-based image processing system includes a seascape identifier which is configured for automatically identifying whether an original image is a seascape. For an image which is identified by the seascape identifier as being a seascape, an enhancement classifier automatically assigns an enhancement class for the image, selected from a plurality of enhancement classes, the classes comprising a first class for images without people's faces and a second class for images with at least one face. The system applies a first enhancement chain for images assigned to the first enhancement class and a second enhancement chain for images assigned to the second enhancement class.

In accordance with another aspect of the exemplary embodiment, a method for processing a set of images includes inputting a set of original images, automatically identifying sea landscape images in the set of images, and automatically identifying portrait seascape images in the set of images. For the images identified as sea landscape images, the method includes automatically applying an enhancement chain which includes a polarizing filter. For the images identified as having portrait seascape images, the method includes automatically applying an enhancement chain which includes detecting skin probabilities for image pixels and applying a local contrast enhancement based on the skin probabilities to reduce shadows on faces in the portrait sea landscape images. The enhanced images are output.

DETAILED DESCRIPTION

Seascapes are photographic images containing a large body of water, such as a sea, large lake, etc. or which are captured on the beach where reflective conditions of sea and/ or sand exist. Digital images which are identified as seascapes often include a significant portion of the image data (such as at least about 5% or at least 10%, or more) corresponding to a body of water. In capturing an image of an outdoor environment where water is present, the observer generally desires to retain the observed contrasts in the water which signify its' motion while retaining the colors of other image content, such as sky and people, and without having excessive shadows on faces.

Aspects of the exemplary embodiment relate to an automated content-based system and method for image enhancement. The method includes three main steps:

1. Image Selection: seascape images are automatically or manually identified, such as beach scenes.

2. Enhancement Opportunity Evaluation: the type of enhancement opportunity is detected. In particular, a category of each seascape image is automatically determined. The categories include 'sea landscape' and 'portrait.' The exact content of these categories will depend to some degree on the training images used for training the system. In general, however, 'sea landscapes' are seascape images which have no people in them, or the people are so small, in relation to the size of the image, that shadows on faces are not perceptible to the viewer. 'Portraits' are seascape images which have a person or people which are sufficiently large, in relation to the size of the image, that any shadows on faces are perceptible to viewers with the unaided eye.

3. Enhancement Chain Processing: a sequence of image processing operations is applied to the image in accordance with the enhancement opportunity determined in the evaluation step. Image enhancements based on the determined category are thus applied which are tailored to a class of enhancement opportunity associated with the category.

As used herein, image enhancements are modifications to the image that are expected to improve the perceptual quality of the image. However, since the application of these image enhancements is automated, it will be appreciated that an assurance that perceptual quality will be improved cannot be guaranteed in all cases of enhancement.

Figure 1:
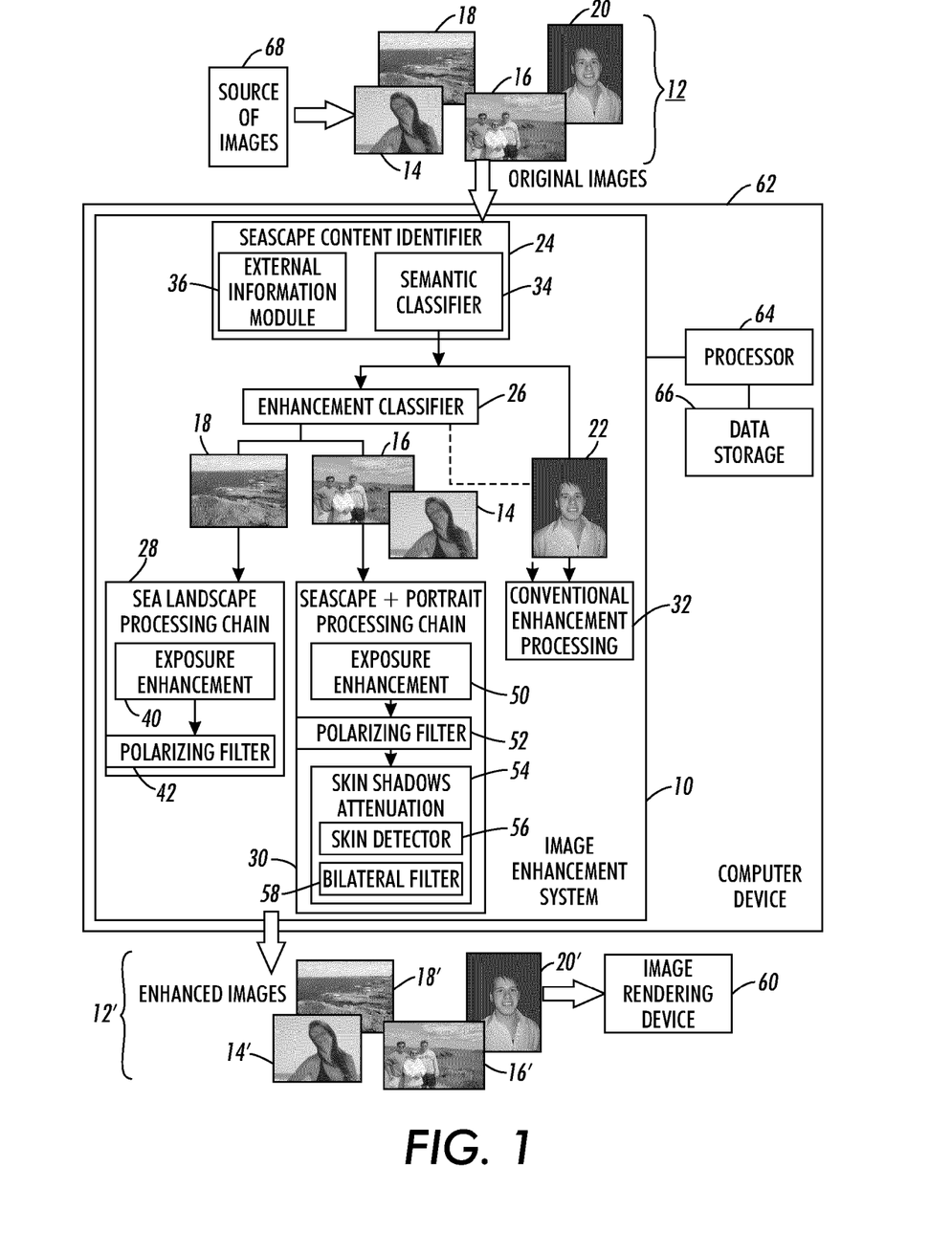
FIG. 1 is a functional block diagram of an automated image enhancement system in accordance with a first aspect of the exemplary embodiment.
Figure 2:
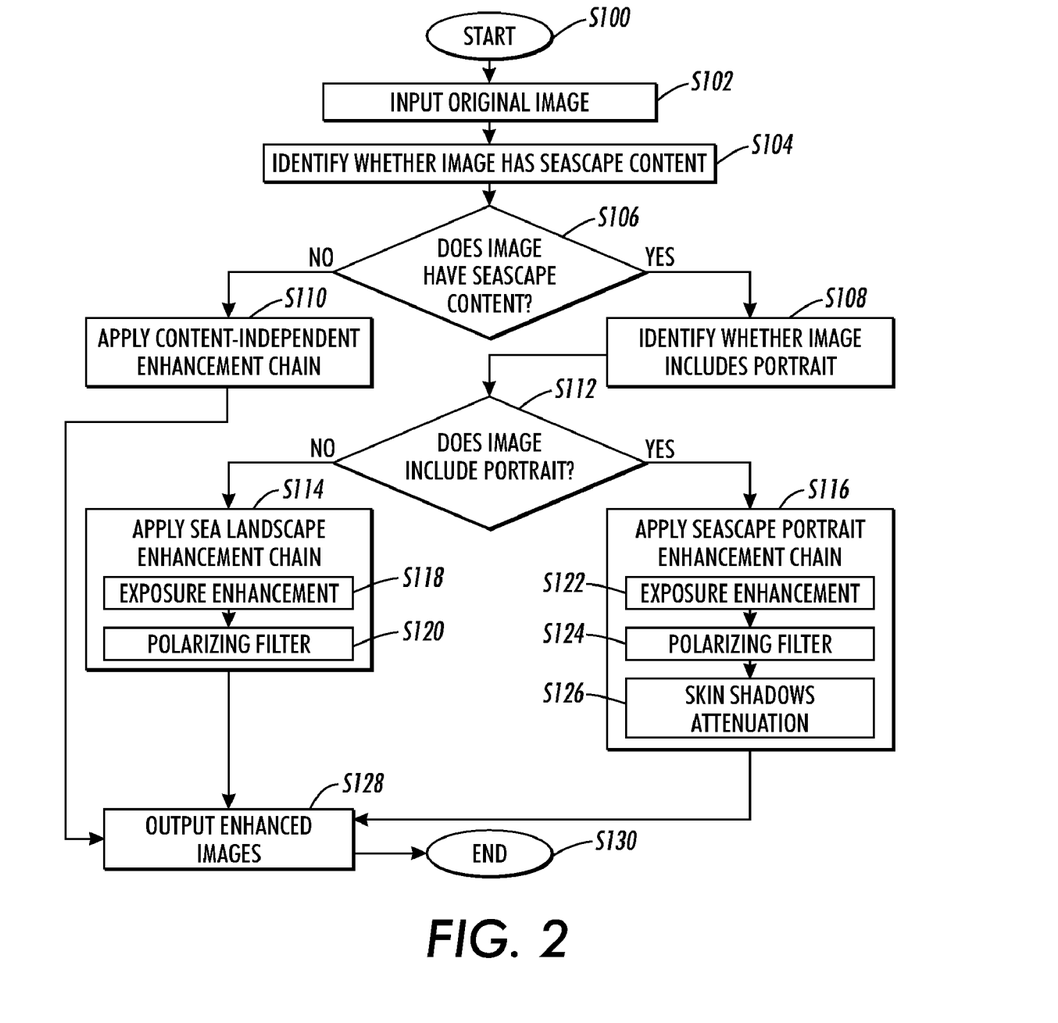
FIG. 2 illustrates an automated or semi-automated image enhancement method in accordance with a second aspect of the exemplary embodiment.

FIG. 1 illustrates an exemplary automated image enhancement system 10 which may be used in performing the exemplary method described herein with reference to FIG. 2. A set 12 of acquired original images 14, 16, 18, 20, to be processed by the system 10 is input in digital form. If the original images are not already in digital form they may be converted to digital form prior to processing. As will be appreciated, the images 14-20 shown in FIG. 1 are for illustration purposes only and do not accurately reflect the system capabilities.

The system 10 includes various image data processing components including a seascape content identifier 24, an enhancement classifier 26 for classifying seascape images into content categories (sea landscapes and portraits), and components for applying category-specific image enhancement chains 28, 30 for images identified as comprising sea landscapes and portraits, respectively. Optionally, the system includes a content independent image enhancement processing component 32 for processing other images.

The exemplary seascape content identifier 24 includes a semantic classifier 34, which classifies each of the input images based on image content to identify seascape images. In particular, the semantic classifier 34 may be a binary classifier which classifies an image as either a seascape image or not a seascape image. In other embodiments, the seascape content identifier 24 additionally or alternatively relies on external information to identify seascape images. For example, an external information module 36 identifies metadata associated with the image, such as GPS tags, labels applied by the photographer, etc., and uses that information to identify images likely to have been captured at the seaside. Alternatively, the seascape images may be manually identified and labeled, with the seascape content identifier 24 merely recognizing the labels and classifying the images based thereon.

Those images identified as seascapes are further processed by the enhancement classifier 26, which classifies the original image according to type of enhancement. In the exemplary embodiment, the enhancement classifier 26 assigns the image to one of two classes: A: "sea landscape images," and B: "portrait images." In another embodiment, the enhancement classifier 26 classifies the image into one of three (or more) classes, such as: A: "sea landscape images," B: "portrait images," and C: "all others." It is to be appreciated, however, that the degradation types and number of classes may be different from these.

The images classes as A or B are then subjected to image enhancement. Images assigned to class A are processed by a first image enhancement chain 28 tailored to improving the perceived quality of sea landscape images. Images assigned to class B are processed by a second image enhancement chain 30, tailored to improving the perceived quality of portrait images and thus using different image enhancement techniques from the first chain. In particular enhancement chain 28 for sea landscape includes an exposure enhancement component 40 and polarizing filter processing component 42, which perform operations on the image in a sequence, as described in greater detail below. Enhancement chain 30 for portraits includes an exposure enhancement component 50, a polarizing filter 52 (optional), and a skin shadows attenuation component 54, which perform operations on the image in a sequence, as described in greater detail below. The exemplary skin shadows attenuation component 54 includes a skin detector 56 and local contrast enhancement component incorporating a bilateral filter 58.

In the case of images which are in class C (or which are classed by the classifier 34 as not seascapes), may be processed by the conventional image enhancement module 32, which may operate independently of image content.

The set 12' of enhanced or otherwise processed images 14', 16', 18', 20' output by these processing components 28, 30, 32 may optionally undergo further image processing and/or user validation prior to being output in digital form or in tangible media. In one embodiment, the output images are sent to an image rendering device 60, such as a printer, for printing on print media, such as photo-quality paper, using colorants, such as inks or toners.

The exemplary image enhancement system 10 may be embodied in hardware, software, or a combination thereof. In the exemplary embodiment, the image enhancement system 10 is hosted by a computing device 62, such as a general purpose computer, e.g., a desktop or laptop computer, palmtop device, PDA, or by a server, or other dedicated computing device. The various processing components of the system 10 may comprise software instructions, stored in the computing device's memory, which are executed by an associated processor 64. Images may be stored in the computer's memory or a separate data storage memory 66 accessible to the processor 64, during processing. The computing device may be in communication with a source 68 of digital images, such as a user's computing device, via a wired or wireless link, such as the Internet. For example, the system 10 may be resident at a photofinishing service which receives the images from a user, e.g., via the Internet or on a disk or other tangible recording medium, automatically processes the images using the exemplary system 10, and then returns the processed images in digital or tangible form to the user. In another embodiment, the system 10 may be resident on a user's computer or accessed therefrom via a web browser. In this embodiment, the user may be provided with the opportunity to accept or reject the proposed enhancements.

FIG. 2 illustrates an exemplary image processing method which may be performed with the system shown in FIG. 1. It is to be appreciated that the method may include fewer, more or different steps than those shown and the steps need not all proceed in the order illustrated. The method begins at S100.

At S102, an image or set of images 14, 16, 18, 20, to be processed is input.

At S104, each input image 14, 16, 18, 20, is processed to identify whether the image is a seascape. In particular, images are classified by a classifier trained to identify images with content corresponding to a large body of water.

At S106, if an image is identified as a seascape, the method proceeds to S108, where enhancement opportunities are detected, otherwise, the method proceeds to S110. At S108, images classed as seascape are classified according to enhancement opportunity ('landscape' or 'portrait'). At S112, if the image is assigned to a sea landscape class, the image is processed according to a first image enhancement chain (S114), designed to enhance sea landscapes without people's faces. If the image is assigned to a portrait class, the image is processed according to a second image enhancement chain (S116), designed to enhance sea landscapes with a person's face (or more than one face). In particular, the first image enhancement chain S114 includes the following substeps: exposure enhancement (S118) and polarizing filter (S120) and the second enhancement chain for portraits includes exposure enhancement (S122), optional polarizing filter processing (S124), and skin shadow attenuation (S126) substeps.

If at S108, seascape enhancement opportunities are not detected, then the image may be processed at S110 with a conventional enhancement technique, such as Xerox's Automated Image Enhancement (AIE) techniques. Steps S104-S116 may be repeated for each image in the set 12. Thus, in any image set, some images may undergo enhancement by S110, while others undergo enhancement by S114, and yet others may undergo enhancement by S116.

The processed images may be combined and output as a processed set at S128, optionally printed, and returned in digital and/or tangible form to the user. Optionally, a user verification step allows the user to review the automatically enhanced image(s) and accept or reject the enhancement(s) prior to printing, or the like. The method ends at S130.

The method illustrated in FIG. 2 may be implemented in a computer program product that may be executed on a computer. The computer program product may be a tangible computer-readable recording medium on which a control program is recorded, such as a disk or hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for processing images.

Further details of the system and method will now be described.

Image Input (S102)

Images may be received by the system 10 in any convenient file format, such as JPEG, TIFF, or the like. Images may be individual or video images. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.). The exemplary embodiment is not intended for black and white (monochrome) images, although it could be modified to allow processing of such images.

Seascape Identification (S104)

The semantic classifier 34 may be one which has been trained on a large set of manually labeled training images. Specifically, human observers are used to identify images in which a body of water or beach scene is clearly apparent and these images are then labeled as "seascape." All the remaining images may be labeled as "not seascape," or may be further classified. The classifier 34 is trained with these manually labeled images. The training involves automatically extracting features from the images and identifying features of the images which allow each of the images to be associated with one of the two (or more) classes.

In one embodiment, images with less than a threshold amount of water may be labeled as "not seascape" by the human observers. The threshold may be determined by identifying whether there is a user preference for images with only small amounts of sea that are processed by conventional techniques over those processed by the exemplary seascape enhancement processing methods. The human observers may then be instructed to label as "not seascape," those images having less than an approximate threshold proportion of water in the image, e.g., less than about 5% or less than about 10% of area coverage.

The trained classifier 34 may output a confidence measure for a new image that the image belongs to the "seascape" class (or "not seascape" class). The confidence measure can be converted to a binary decision, "seascape" or "not seascape." The threshold for the decision may be set based on user preferences, i.e., whether users prefer images which have been enhanced by the methods described herein over conventional methods if the confidence is low.

The semantic classifier 34 may be of any suitable type, such as neural networks, support vector machines, or the like. In one embodiment, the classifier is a generic type of visual classifier, such as the Xerox Generic Visual Classifier (GVC) as described, for example, in U.S. Pub. Nos. 2007/0005356, 2007/0258648, and 2008/0069456, incorporated herein by reference. Such a classifier 34 labels patches (small regions) of an image based on semantic content, for example, by generating low level features, such as a features vector, one for each patch. The classifier uses a vocabulary of visual words (or multi-word terms) to characterize images with a histogram of visual word counts. For the specific case of seascape/non-seascape image classification, such features can sample the chromatic content of the image. Every image is characterized by a set of histograms—one per class—where each histogram describes whether the image content is best modeled by the universal vocabulary or the corresponding class vocabulary. This framework is applied to two types of local image features: low-level descriptors such as Scale Invariant Feature Transform (SIFT) descriptors and high-level histograms of word co-occurrences in a spatial neighborhood.

In one embodiment, the classification includes a bag of visual word (BOV) based approach. In this approach, the image is first characterized by a histogram of visual word counts. The visual vocabulary is built automatically from a training set of images. To do this, some image descriptors are extracted from the image. Those descriptors are generally based on texture, color, shape, structure, or their combination and are extracted locally on regions of interest (ROI). The ROI can be obtained by image segmentation, by applying specific interest point detectors, by considering a regular grid, or by or simply random sampling of image patches. For example, Scale Invariant Feature Transform (SIFT) descriptors may be computed on each region.

Given a new image to be classified, it is processed in a similar way and assigned to the most probable class, based on its features. For example, in the case of the BOV approach, each feature vector is assigned to its closest visual word in the previously trained vocabulary or to all visual words in a probabilistic manner in the case of a stochastic model. The histogram is computed by accumulating the occurrences of each visual word. Finally, the histogram is fed to one or a set of classifiers, for example K nearest neighbor, probabilistic latent semantic classifiers. The classifier 34 may analyze the entire image or focus on objects within the image.

Further details of exemplary categorization techniques which may be used herein are to be found in U.S. Pub. Nos. 2007/0005356, 2007/0258648, and 2008/0069456, and in the following references: Csurka, G., Dance, C., Fan, L., Willamowski, J., and Bray, C., "Visual Categorization with Bags of Key-points," in *ECCV Workshop on Statistical Learning for Computer Vision* (2004); Perronnin, F., Dance, C., Csurka, G., and Bressan, M., "Adapted Vocabularies for Generic Visual Categorization," in *European Conf. on Computer Vision*. (2006); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004); and Bosch, A., Zisserman, A., and Munoz, X., "Scene Classification via pLSA." in *ECCV* (2007).

Alternatively or additionally, step S104 may include processing of image metadata information such as time, GPS coordinates, etc. For example, GPS coordinates for regions of the world likely to have sea or large lake where the photograph was captured are fed into the system 10. Images for these coordinates may be flagged as "potential seascape."

This information may be used to improve the accuracy of the classifier 34 or used with other techniques for confirming that the image is a seascape.

The output of S104 is a set of images labeled with labels that identify then as either "seascape" or "not seascape". These labels may be in the form of XML/HTML labels incorporated in the image data, or attached as metadata or provided in a separate file with the set of images. Only those images classed as 'seascape' go on to step S108. Other images receive a different image enhancement processing or receive no image enhancement.

Enhancement Classification (S108)

The enhancement opportunity can be identified by a second classifier 26, such as a GVC or other classifier of the type described above, which is trained to classify previously classified seascape images into sea landscape images (not containing people's faces) and portrait images containing people's faces in a seascape. For example, images in a training set of "seascape" images of the type described above, are labeled by human observers as "landscape" or "portrait" (additional classes are also contemplated, such as "other"). The classifier is trained on this set of images. In the exemplary embodiment, the classification is a two class problem—the classifier 26 is simply trained to distinguish images without people's faces from images with people's faces. The classifier then outputs a decision for a new image—'sea landscape' or 'portrait.'

Alternatively, the enhancement opportunity can be identified by determining whether the image contains skin pixels. This may be performed with a skin detector based on color which generates a skin probability mask. Images having a threshold proportion of pixels with a high probability of being skin are then classed as "portrait." Other face detection techniques may also be employed, as disclosed, for example, in U.S. Pat. Nos. 6,009,209, 6,278,491, and 6,278,401.

Using a two step classification method, as described above, in which images first classified as either "seascape" or "not seascape" and then determining the enhancement opportunity for the "seascape" images is generally easier than a single classification step in which the image is classified into one of three classes: sea landscape, seascape with portrait, and other. However, such a method is not excluded.

Degradation Specific Enhancements (S114, S116)

For each enhancement opportunity identified at S108, a different set of processing operations called an "enhancement chain" is applied. The enhancement chains can be tailored to take into account the results of a user preference evaluation and the analysis of a set of images used in the tests. In the exemplary embodiment, three alternate enhancement chains are employed: for sea landscapes (S114), sea portraits (S116), and if no enhancement opportunities related to seascapes are detected, the images are processed with a generic image enhancement system (e.g. Xerox AIE) (S110). In other embodiments, multiple categories of enhancement may be provided, including those described in U.S. application Ser. No. 12/123,586, for enhancement of snow images.

1. Sea Landscape (S114)

In the case of sea landscape images (those images where observers would typically consider the images to be not portraits), the enhancement chain S114 includes the following steps: exposure enhancement (S118) and polarizing filter (S120).

Exposure refers to the average of the global distribution of intensity along the dynamic range of the image. Making the image darker or lighter can bring details from the shadows or give depth to the colors of the photograph.

The exposure enhancement (S118) may be performed according to the methods described in U.S. Pat. No. 5,414,538, incorporated herein by reference in its entirety, and in Eschbach, R. and Fuss, W., "Automatic Enhancement of Scanned Photographs," in *El Color Imaging: Device Independent Color, Color Hardcopy and Graphic Arts* (1999). This approach to correcting exposure is to apply gamma correction to the image intensity. For example, the gamma parameter may be determined automatically from the histogram of the input image. The exemplary method evaluates the occupancy of the dynamic range of the image and, based on predefined thresholds, determines an appropriate correction it has to perform (e.g., over-expose, under-expose) and also the amount of correction (low, medium, high).

This step (S118) adds exposure to the image to compensate for the polarizing filter that tends to underexpose the image. A global correction is typically applied, i.e., without considering image content.

The exemplary polarizing filter step (S120) simulates the effect which can be achieved with an actual polarizing filter. A polarizing filter is a filter which is often employed by experienced photographers for reducing the reflections and for darkening blue skies and green vegetation. Color saturation is also significantly enhanced. The method takes advantage of the fact that for certain types of RGB images (e.g., natural pictures with elements like water and sky and vegetation) the red channel's characteristics can reproduce some of the effects of an actual polarizing filter on the luminance of the image.

Figure 3:
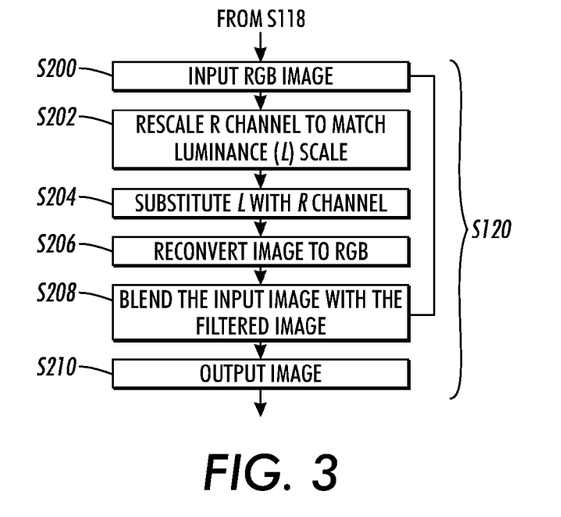
FIG. 3 illustrates an enhancement chain for seascape images identified as landscapes in the method of FIG. 2.

FIG. 3 illustrates steps of an algorithm which may be used for the polarizing filter step (S120). If the image data of an image 18 to be processed by the sea landscape enhancement chain is not expressed in a luminance-chrominance color space with a luminance (brightness) component, such as CIE-Lab color space L*a*b*, YCbCr, YUV, YIQ, YES, or LUV, then at S200, the data is converted to such a color space. Suitably, if the color information of the pixels is received in a proper color space, i.e. one having a luminance component, the converting process may be optionally ignored or skipped. In the exemplary embodiment, the color information of the input image is received in RGB color space. In RGB color space, each pixel's color is determined by a red component, a green component, and a blue component as is well known in the art. This information is converted to a color space having a luminance or brightness value, Y or L, and chrominance values, (e.g. I, Q or E, S or a,b or u,v) which refer to hue and saturation values. For example, the image data may be input in RGB values and converted to a Lab luminance-chrominance color space. Various methods exist for converting image data from one color space to another. For example, a color space conversion component may include a look up table or other data structure to which the RGB image data is fed, which outputs the corresponding luminance-chrominance values.

In the exemplary embodiment, the input RGB image is converted in Lab color space.

$$I_{in}^{RGB} \rightarrow I_{in}^{Lab}$$

At S202, the red channel of the input RGB image, $I_{in}^{RGB}$, is rescaled in order to match the luminance scale L. Luminance L in Lab space is typically expressed on a scale of 0-100, where 0 represents minimum luminance intensity (black) and 100 represents maximum luminance intensity (white). The rescaling factor $$k = \frac{100}{256}$$

for an 8 bit RGB scale. Thus, for example, if a pixel of the input image has RGB values of 100, 110, 160 on a 0-255 scale, then the red channel value 100 is multiplied by $$\frac{100}{256} = 39.$$

Each pixel of the image is treated in the same way. At S204, the rescaled $I_{in}^{RGB}$ value for the pixel is then substituted for the current L channel value of the image $I_{in}^{Lab}$, obtaining a new image $I_{tmp}^{Lab}$. The a and b values are unchanged, so:

$$I_{tmp}^{L} = k \cdot I_{in}^{R}, I_{tmp}^{a} = I_{in}^{a}, I_{tmp}^{b} = I_{in}^{b}$$

At S206, the image is reconverted to RGB to produce a filtered image:

$$I_{tmp}^{Lab} \to I_{tmp}^{RGB}$$

At S208, an output image $I_{out}^{RGB}(x,y)$ is generated by blending together the input image $I_{in}^{RGB}$ and the filtered $I_{tmp}^{RGB}$ for each pixel location (x,y):

$$I_{out}^{RGB}(x,y) = \alpha \cdot m(x,y) \cdot I_{tmp}^{RGB}(x,y) + (1-\alpha) \cdot m'(x,y) \cdot I_{tmp}^{RGB}(x,y),$$

where $m(x,y) = I_{in}^{R}/255$, $$m'(x,y) = 1 - m(x,y),$$

α is a constant which may be used for regulating the intensity of the enhancement, e.g., $0 \leq \alpha \leq 1$, and m(x,y) is a mask function that attenuates the enhancement on the reds of the input image.

The constant α may have a value of, for example, at least about 0.2 and in one embodiment, is about 0.6. In another embodiment, a user may be allowed to select a value of α which gives pleasing results. In other embodiments, the value of α may differ for different regions of an image. For example, regions identified as likely being sky may be assigned a higher value of α than other regions. At S210, the blended image is output.

The overall effect of this step (S120) is to alter the chromatic composition of the image, making blues darker and greens greener.

The enhancement chain for sea landscapes is not limited to these enhancements, but may be include additional or different enhancements, which may be identified from and/or validated by user preference studies.

2. Seascape Portrait (S116)

For the images 18 classed as sea portrait, a different enhancement chain is employed which, in addition to optionally altering the chromatic composition of the image, making blues darker and greens greener, also attends to unwanted shadows by local contrast attenuation.

As previously noted, step S116 includes an exposure enhancement step S122. This step may be performed as for step S118 of enhancement chain S114 on images 14, 16 in the portrait class. Optionally, a polarizing filter step S124 is performed, as described for S120. The main difference between the two enhancement chains is the application of shadow attenuation (S126), for skin regions of the image, which is used only in enhancement chain S116, i.e., not in enhancement chain S114. Step S126 attends to harsh shadows on the face, which are often found in images captured in direct sunlight on the beach.

Figure 4:
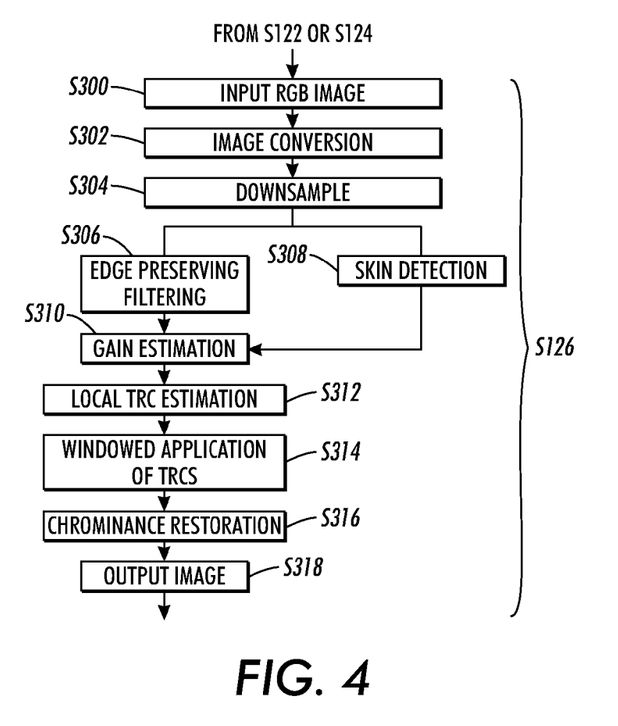
FIG. 4 illustrates an enhancement chain for seascape images identified as portraits in the method of FIG. 2.

FIG. 4 illustrates steps in an algorithm for the skin shadow attenuation (S126). Briefly, this step includes detection of regions corresponding to skin and using this skin information to adjust a local transform (tone reproduction curve (TRC)) for attending to shadows in these regions.

Many approaches are available for dealing with shadows in still images and in video sequences, which may be utilized herein. Some of them derive the intrinsic reflectance of the image, as described, for example, in H. Barrow and J. Tenenbaum, "Recovering intrinsic scene characteristics from images," in Computer Vision Systems, A. Hanson and E. Riseman, Eds. Academic Press, 1978, pp. 3-26 (Hereinafter "Barrow"). Others are based on modified versions of the Retinex algorithm (see, for example, G. D. Finlayson, S. D. Hordley, and M. S. Drew, Removing shadows from images, ECCV 2002 (Hereinafter "Finlayson"). Still others use flash/no flash images to detect and correct the images (see, for example, Arici, T., Dikbas, S, Skin-Aware Local Contrast Enhancement, ICIP 2007. IEEE International Conference on Volume 1, Sep. 16, 2007-Oct. 19, 2007 Page(s): I-521-I-524.

In the specific case of skin shadows, skin detection techniques, such as these, may be used to detect the region(s) of the image where attenuation should be performed. Skin shadows generally belongs to the category of "form" or "attached shadows" because they are fixed to their objects and they are generated by sub-parts of the objects (e.g., the nose in the face). Accordingly, a segmentation of the skin region is performed prior to removal of the shadows, allowing other regions to receive no correction.

In various embodiments therefore, skin information can be combined with existing shadows-removal algorithms. For example, using the shadow removal techniques of Barrow, the average skin grey-level is compared to a reference value for mid tones. In another embodiment, which employs the shadow correction techniques of Finlayson, an existing contrast enhancement method is weighted by skin masks.

In one specific embodiment, a local contrast enhancement algorithm is adapted to the case of removal of shadows in detected skin regions. This embodiment utilizes a method for local contrast enhancement as described in U.S. Pub. No. 2007/0009167, entitled CONTRAST ENHANCEMENT OF IMAGES, by Dance, et al.; and in Bressan, M., Dance, C. R., Poirier, H., Arregui, D., Local contrast enhancement, Proceedings of SPIE-IS&T Electronic Imaging—Color Imaging XII: Processing, Hardcopy, and Applications 2007, 6493, 64930Y/1-12, the disclosures of which are incorporated herein by reference. The algorithm described in U.S. Pub. No. 2007/0009167 and Bressan, et al. has several advantages: it is fully automatic, it performs contrast/exposure enhancement locally in the image, and it is conservative (less likely to introduce artifacts than other techniques).

Referring to FIG. 4, the main substeps of step S126 of the method are as follows:

At S300 a 'portrait' image 14, 16 is input in RGB.

At S302, image conversion is performed. In particular, the input image $I_{in}$ is converted to a luminance-chrominance color space with a luminance channel, such as YIQ color space. In the YIQ color space, Y represents the luminance value, I represents the chrominance value along the orange-blue color axis, and Q represents the chrominance value along the purple-green color axis. Other luminance-chrominance color spaces may alternatively be used.

At S304, downsampling may be performed. In this step, the luminance channel $Y_{in}$ of the image may be resized to $\tilde{Y}_{in}$ to reduce the computational load. The down-sampled version of the input image is a low-resolution version where some of the luminance values of the pixels have been discarded. In the exemplary embodiment, the image is down-sampled by an integer factor to some suitable target resolution, such as 320× 240.

Figure 5:
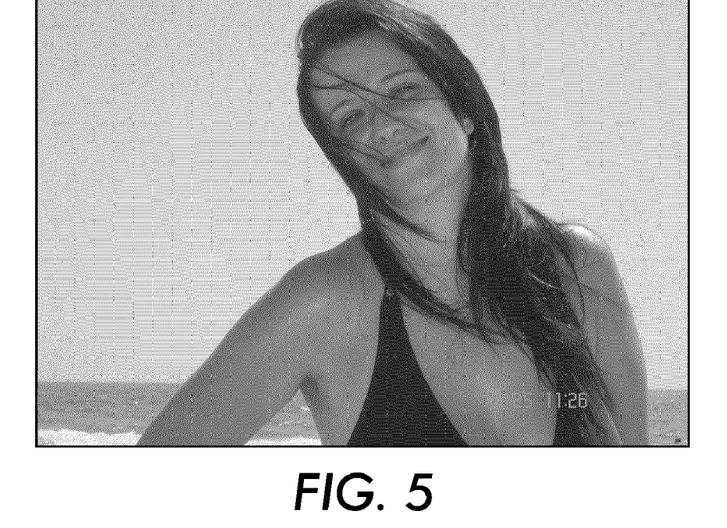
FIG. 5 illustrate an exemplary portrait seascape image.
Figure 6:
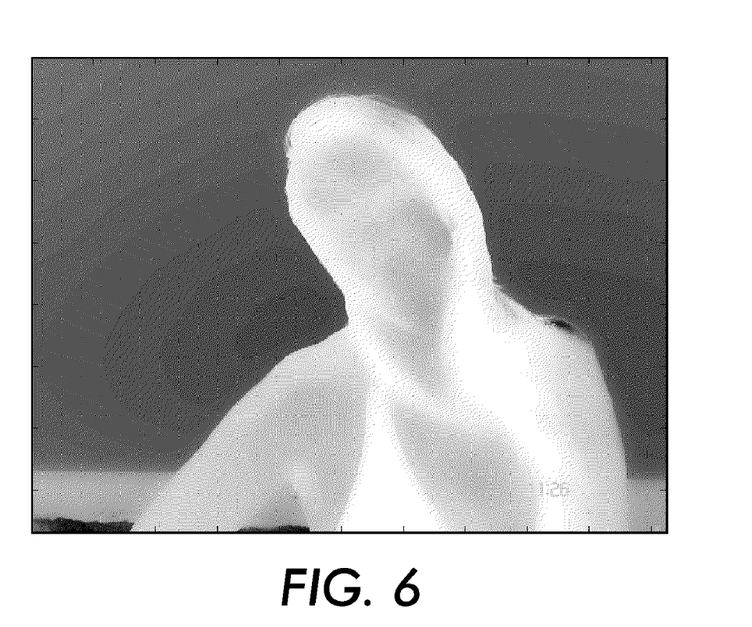
FIG. 6 illustrates a luminance channel of the image of FIG. 5 after processing with a bilinear filter.

At S306, edge-preserving filtering is applied. In particular, bilateral filtering is applied on the luminance channel $\hat{Y}_{in}$ (or $Y_{in}$ if no downsampling) of the image, obtaining a grayscale image $\hat{Y}_{blf}$. This step is illustrated in FIGS. 5 and 6, where an original image (FIG. 5) is processed to produce an image as shown in FIG. 6, where regions are smoothed but the edges are preserved.

In general, bilateral filtering replaces the pixel value at x,y with an average of similar and nearby pixel values. Therefore, in smooth regions, pixel values in a small neighborhood are similar to each other and as a consequence, the bilateral filter acts essentially as a standard domain filter, and not only averages away the correlated differences between pixel values caused by noise, but also averages out weak features whose contrast is to be enhanced. Techniques for bilateral filtering are described, for example, in U.S. Pub. No. 2007/0009167.

Figure 7:
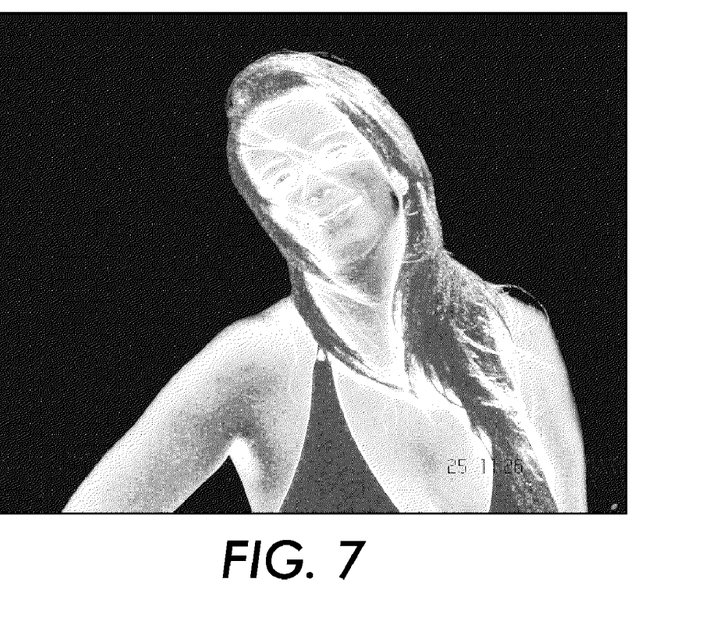
FIG. 7 illustrates a skin probability map generated for the image of FIG. 5.

At S308, a skin detection step is applied to detect pixels likely to be skin. This step may be performed using the downsampled image $\hat{Y}_{in}$ (or image $Y_{in}$ if no downsampling) rather than the smoothed image. In this step, a skin probability map $\hat{Y}_{skin}$ can be generated, as illustrated in FIG. 7, where white pixels correspond to high probability. Any of the methods described in Barrow, Finlayson, Arici, or others can be used to create a skin probability map which, for each pixel in the image (or a downsampled image), provides a probability that the pixel corresponds to a person's skin (e.g., part of the face). The outputs of steps S306 and S308 can both be used in subsequent steps.

The method then proceeds to S310, where gain estimation is performed. In this step, $\hat{Y}_{blf}$ is used to estimate a gain map G that resolves, for each pixel, the problems of over-exposure and under-exposure. In particular, the map indicates the shadow regions (underexposed regions) by assigning them higher values. As described in further detail below, the skin probability map $\hat{Y}_{skin}$ can be used to modify the gain map G at this step, or in selectively application of the TRCs at S312, as described in further detail below.

At S312, local TRCs estimation is performed. In this step, the gain map developed in S310 is first applied to the input image $Y_{in}$, i.e., $\hat{Y}_{out} = G \cdot \hat{Y}_{in}$. The image $\hat{Y}_{in}$ is then subdivided into m predefined windows (sub-images) 70 (FIG. 8), which may be of uniform size. m can be for example, from about 16 to about 144, e.g., 64. While the exemplary windows 70 are rectangular and are of uniform size, other ways of dividing the image into a set of discrete regions are contemplated. For each window, a transform is generated, i.e., 64 local TRC tone reproduction curves $T_m$ are generated, one for each of the m predefined sub-images. The sub-image transform is estimated by mapping input luminance values $Y_{in}$ to output luminance values $\hat{Y}_{out}$ for that region. In the exemplary embodiment, a histogram is derived for each sub-image by plotting the number of pixels at each possible luminance value in the sub-image. From the histogram, a monotonic tone reproduction curve (TRC) for the sub-image can estimated which maps $\hat{Y}_{in}$ (down-sampled image) to $\hat{Y}_{blf}$ (bilaterally filtered image) in, for example, a least squares fit or model. To apply the local TRCs to the high res image $Y_{in}$, the TRCs are regressed. Specifically, the TRCs have been estimated at low resolution, therefore with a reduced set of pixels. The regression step provides a more complete TRC for the pixels of the full resolution image.

At S314, the TRC generated for each sub-window is applied to the respective block of the full-resolution image $Y_{in}$ to obtain the output image $Y_{out}$. Blocking artifacts can be avoided by obtaining the value for each pixel from the result of interpolating the TRCs for the neighboring windows to the pixel. For example, the value for each pixel may be obtained using the equation:

$$Y_{out}(x, y) = \frac{\sum_{n=1}^{9} TRC_n(Y_{in}(x, y)) \cdot \exp^{-d_n/\sigma}}{\sum_{n=1}^{9} \exp^{(-d_n/\sigma)}}$$

where n represents the number of a neighboring window (each pixel is influenced by the TRCs of nine windows, including the window in which it is located and the eight adjacent ones), $d_n$ represents the Euclidian distance from the pixel to the center of the window n, and σ represents a parameter that regulates the blending between windows (in particular, the standard deviation of the Gaussians).

At S316, chrominance restoration may be performed. An inverse color space conversion is applied to the output image $Y_{out}$. In the exemplary embodiment, the output image ($Y_{out}$) along with the corresponding chrominance component values is converted back into the RGB color space resulting in a contrast enhanced image, $I_{enhanced}$. In this step, hue and saturation are preserved in $Y_{out}$ through a linear re-combination of R, G, B channels.

At S318, the processed image is output.

In the exemplary embodiment, the information in the skin probability map $\hat{Y}_{skin}$ (FIG. 7) is combined with the bilateral filter information (FIG. 6). Three ways of utilizing the skin probability map are given, by way of example, as follows.

In the first two approaches (method 1 and 2), the respective outputs are substituted for the output of the bilateral filter (S306).

Method 1

$$\hat{Y}'_{blf} = \hat{Y}_{blf} \cdot \beta - \hat{Y}_{skin} \cdot (1-\beta)$$

where β represents a parameter, e.g., $0 \leq \beta \leq 1$.

In this approach, to obtain $\hat{Y}'_{blf}$, the skin probability map is linearly combined with $\hat{Y}_{blf}$ through the parameter β. β may be, for example, at least 0.1, and in some embodiments, may be less than 0.9, e.g., about 0.6. Suitable values for β can be determined through user preference studies.

Method 2

In this method, the skin probability map $\hat{Y}_{skin}$ is thresholded to create a binary map B(x,y), with 1 and 0 values corresponding, respectively, to skin (at or above the threshold) and non skin pixels (below the threshold).

$$\hat{Y}''_{blf} = \hat{Y}_{blf} \cdot (\phi - (\phi-1) \cdot B)$$

where φ represents a constant

B represents the binary map $\hat{Y}''_{blf}$ is forced to a constant value φ for non-skin pixels: (B(x,y)=0), otherwise the bilateral filter response $\hat{Y}_{blf}$ is left unchanged. This guarantees that for non skin pixels, the gain applied through the TRC in the input image is minimum.

Method 3

In this approach, skin information is introduced corresponding to the windows used in generation of the local TRCs (S310). In particular, for each sub-window m, the cumulative skin probability $p_m$ for that sub-window is determined from the skin probability map:

$$p_m = \frac{1}{S} \cdot \sum_{x,y} \hat{Y}_{skin}(x, y)$$

where S represents the number of pixels in the sub-window.

Figure 8:
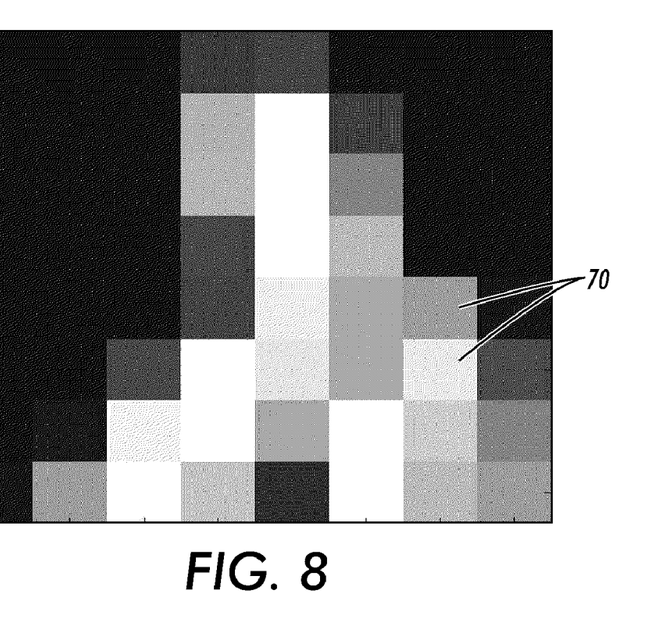
FIG. 8 illustrates a cumulative skin probability map for image partitioned windows of the image of FIG. 5.

As can be seen in FIG. 8, for those blocks 70 corresponding to skin windows, $p_m$ is higher (whiter) whereas in the background areas the cumulative probability is low. The results can be thresholded. Suitable values for the threshold $th_{skin}$ can be determined through user preference studies. One of two different TRCs is applied to each sub-window, depending on whether $p_m$ meets the threshold:

$$T'_m = \begin{cases} T_m & \text{if } p_m \geq th_{skin} \\ T_I & p_m < th_{skin} \end{cases}.$$

In practice, in windows where the probability of containing skin is low (below the threshold), a TRC $T_I$ that does not alter the window is chosen, i.e., $Y_{in}=T_I(Y_{in})$. Otherwise the TRC $T'_m$ generated in S312 is applied. Moreover, additional constraints such as the level of noise or extent of JPEG compression in the window can be utilized in the selection of the TRC.

The enhancement chain for portraits is not limited to these enhancements, but may include additional or different enhancements, which may be identified from and/or validated by user preference studies.

3. Automated Image Enhancement

Optionally, for those images not classed as seascapes, automated image enhancement is employed as a third enhancement chain (S110). The automated enhancement techniques applied may include methods for correcting exposure, global and local contrast, noise reduction, edge sharpening, color balance, and saturation enhancement. In one embodiment, the Xerox AIE system is used for this enhancement chain. (See for example, www.xerox.com/downloads/usa/en/f/FILE_PROD_AIE_Brochure.pdf and the techniques disclosed in U.S. Pat. Nos. 5,357,352, 5,363,209, 5,371,615, 5,414,538, 5,450,217, 5,450,502, 5,802,214, 5,347,374, and 7,031,534, incorporated by reference.)

The exemplary method can provide improvements over conventional content independent enhancement techniques for many images.

Without intending to limit the scope of the exemplary embodiment, the following Example illustrates the effects of the exemplary enhancement chains on seascape images.

Example

The exemplary enhancement chains S114, S116 described herein were applied to a set of images taken in a seaside environment, with and without human subjects. The results were compared with conventional automated image enhancement techniques. The first enhancement chain 28, S114, based on the polarizing filter without shadows attenuation, enhances the sky with more contrast and also slightly reduces the effects of the reflections in the water.

The second enhancement chain 30, S116 was tested with the three different modifications to the basic local contrast enhancement algorithm described above. Method 1 is the most conservative and Method 2 was the most aggressive. From a preliminary analysis, Method 3 gave the best results and did not introduce artifacts. Moreover, it is not overly aggressive in images which already have what is considered by observers to be a correct skin luminance.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A content-based image processing method comprising:
automatically identifying whether an original image is a seascape; and
for an image which is identified as being a seascape:
automatically assigning an enhancement class for the image, selected from a plurality of enhancement classes, the classes comprising a first enhancement class for sea landscape images and a second enhancement class for portrait images,
processing the image to generate an enhanced image, comprising:
where the image is assigned to the first enhancement class, applying a first enhancement chain, the first enhancement chain comprising applying a polarizing filter to the image, the applying of the polarizing filter comprising substituting a luminance value with a red component value for pixels in the image, and
where the image is assigned to the second enhancement class, applying a second enhancement chain, and
outputting the enhanced image.

2. The method of claim 1, wherein the identifying whether the image is a seascape includes classifying the image with a first automated classifier trained to distinguish between seascape images and non-seascape images, based on image content.

3. The method of claim 1, wherein the assigning an enhancement class for the image includes classifying the image with a second automated classifier trained to distinguish between images without people's faces and images with at least one face of a person.

4. The method of claim 1, wherein the second enhancement chain comprises detecting skin probabilities for pixels in the image and applying local contrast enhancement based on the skin probabilities.

5. The method of claim 1, wherein when the image is not identified as being a seascape, the method includes applying a content-independent enhancement chain to the image.

6. A content-based image processing system comprising:
a seascape identifier which is configured for automatically identifying whether an original image is a seascape;
an enhancement classifier which, for an image which is identified by the seascape identifier as being a seascape, automatically assigns an enhancement class for the image, selected from a plurality of enhancement classes, the classes comprising a first class for images without people's faces and a second class for images with at least one face;
the system applying a first enhancement chain for images assigned to the first enhancement class and a second enhancement chain for images assigned to the second enhancement class, the system including at least one of:
  a) in the first enhancement chain, a polarizing filter component for applying a polarizing filter to the image comprising, for pixels in the image, substituting a luminance value with a rescaled red component value, and
  b) in the second enhancement chain, a skin detector for detecting skin probabilities for pixels of the image and a local contrast enhancement component, the local contrast enhancement component resolving problems of over-exposure and under-exposure for pixels of the image based on the skin probabilities and bilateral filtering.

7. The system of claim 6, wherein the seascape identifier includes a first automated classifier trained to distinguish between seascape images and non-seascape images based on image content.

8. The system of claim 6, wherein the system includes the polarizing filter component for applying a polarizing filter to the image in the first enhancement chain.

9. The system of claim 6, wherein the system includes the skin detector for detecting skin probabilities for pixels of the image and the bilateral filter for filtering pixels of the image in the second enhancement chain in the second enhancement chain.

10. The system of claim 6, further comprising a content-independent enhancement processor for processing images that are not identified as seascapes.

11. A content-based image processing method comprising:
  automatically identifying whether an original image is a seascape; and
  for an image which is identified as being a seascape:
    automatically assigning an enhancement class for the image, selected from a plurality of enhancement classes, the classes comprising a first enhancement class for sea landscape images and a second enhancement class for portrait images,
    processing the image to generate an enhanced image, comprising:
      where the image is assigned to the first enhancement class, applying a first enhancement chain, the first enhancement chain comprising:
        performing an exposure enhancement of the image, and
        after the performing of the exposure enhancement of the image, applying a polarizing filter to the image, and
      where the image is assigned to the second enhancement class, applying a second enhancement chain, and
    outputting the enhanced image.

12. A content-based image processing method comprising:
  automatically identifying whether an original image is a seascape; and
  for an image which is identified as being a seascape:
    automatically assigning an enhancement class for the image, selected from a plurality of enhancement classes, the classes comprising a first enhancement class for sea landscape images and a second enhancement class for portrait images,
    processing the image to generate an enhanced image, comprising:
      where the image is assigned to the first enhancement class, applying a first enhancement chain, and
      where the image is assigned to the second enhancement class, applying a second enhancement chain, the second enhancement chain comprising detecting skin probabilities for pixels in the image, and applying local contrast enhancement based on the skin probabilities, including:
        bilateral filtering a luminance channel of the image;
        partitioning the image into a set of windows; and
        for each window, determining a transform to apply, based on the skin probabilities and bilateral filtering, and
      outputting the enhanced image.

13. The method of claim 12, wherein the first enhancement chain comprises applying a polarizing filter to the image.

14. The method of claim 13, wherein the applying of the polarizing filter comprises substituting a luminance value with a red component value for pixels in the image.

15. The method of claim 12, the second enhancement chain further comprising:
  computing a cumulative skin probability for each window; and
  where the computed skin probability is above a threshold, applying a first transform to pixels within the window, which is dependent on the bilateral filtering.

16. The method of claim 15, further comprising:
  where the computed skin probability is below the threshold, applying a second transform to pixels within the window, which is independent of the bilateral filtering.

17. The method of claim 15, further comprising:
  deriving the transform which is dependent on the bilateral filtering for at least one window which maps pre-filtered luminance values of the window to post-filtered luminance values of the window.

18. The method of claim 12, further comprising:
  down-sampling the image prior to bilateral filtering of the image.

19. A method for processing a set of images comprising:
  inputting a set of original images;
  automatically identifying sea landscape images in the set of images;
  automatically identifying portrait seascape images in the set of images;
  for the images identified as sea landscape images, automatically applying an enhancement chain which includes performing an exposure enhancement of the images prior to applying a polarizing filter;
  for the images identified as portrait seascape images, automatically applying an enhancement chain which includes detecting skin probabilities for image pixels and applying a local contrast enhancement based on the skin probabilities to reduce shadows on faces in the portrait sea landscape images; and
  outputting the enhanced images.

20. A non-transitory computer program product which encodes instructions which, when executed by a computer, perform the method of claim 1.

21. A non-transitory computer program product which encodes instructions which, when executed by a computer, perform the method of claim 11.

22. A non-transitory computer program product which encodes instructions which, when executed by a computer, perform the method of claim 12.

* * * * *